(12) United States Patent
Earl (10) Patent No.: US 6,997,724 B2
(45) Date of Patent: Feb. 14, 2006

(54) AIRCRAFT BATTERY LOCKOUT DEVICE

(76) Inventor: Ronald J. Earl, 81 Rainbow Crest, Hopewell Junction, NY (US) 12533

(*) Notice: Subject to any disclaimer, the term of this patent is extended or adjusted under 35 U.S.C. 154(b) by 0 days.

(21) Appl. No.: 10/877,169

(22) Filed: Jun. 28, 2004

(65) Prior Publication Data

US 2005/0287851 A1    Dec. 29, 2005

(51) Int. Cl.
  *H01R 13/44*    (2006.01)
(52) U.S. Cl. ...................... 439/133; 439/134
(58) Field of Classification Search ............... 439/133, 439/134, 135, 149, 136
  See application file for complete search history.

(56) References Cited

U.S. PATENT DOCUMENTS

| | | | |
|---|---|---|---|
| 1,558,491 A | 10/1925 | Morfoot | |
| 1,902,456 A | 3/1933 | Matthews | |
| 1,923,692 A | 8/1933 | Sloane | |
| 2,022,090 A | 11/1935 | Roberts | |
| 2,328,535 A | 9/1943 | Ambruster | |
| 2,535,126 A | 12/1950 | Flowers et al. | |
| 3,093,515 A | 6/1963 | Rector | |
| 3,826,115 A | 7/1974 | Davis | |
| 4,535,863 A | 8/1985 | Becker | |
| 4,754,627 A | 7/1988 | Butler, III | |
| 4,853,960 A * | 8/1989 | Smith | 379/437 |
| 5,277,599 A * | 1/1994 | Nilson | 439/133 |
| 5,427,541 A | 6/1995 | Calio | |
| 5,573,412 A * | 11/1996 | Anthony | 439/133 |

* cited by examiner

Primary Examiner—Chandrika Prasad
(74) Attorney, Agent, or Firm—Joseph L. Spiegel; Heslin, Rothenberg, Farley & Mesiti, PC (57) ABSTRACT

An aircraft battery lockout device is used to isolate the connector assembly for the aircraft's wiring harness from the battery power receptacle. In one embodiment the device comprises a cover, lock, and insulative material. The cover is locked onto the battery power receptacle. The insulative material provides electrical isolation between the locking device and the battery power receptacle. In a second embodiment the device is locked onto the connector assembly.

4 Claims, 7 Drawing Sheets

AIRCRAFT BATTERY LOCKOUT DEVICE

BACKGROUND OF THE INVENTION

1. Field of the Invention

This invention relates in general to aircraft security, in particular to a device for securing the electrical system of an aircraft when not in use.

2. Description of the Prior Art

The National Transportation Safety Board is evaluating various security measures to prevent aircraft on the ground from being seized. In some areas of the country it is required that there be two methods of locking the aircraft. Typically, one acceptable method is locking the cabin. Another is to disconnect the battery from the aircraft electrical system and lock the compartment where the battery is housed.

The latter solution is lacking in that the compartment can be broken into and the aircraft's electrical system quickly connected to the battery power source for the aircraft.

SUMMARY OF THE INVENTION

A primary object of this invention is providing security for the electrical system of an aircraft when the aircraft is not in use.

Another object is the provision of security for an aircraft without the need for any modification to the aircraft or to the electrical system of the aircraft.

These and other objects are accomplished in accordance with the teachings of the present invention. An aircraft battery lockout device is used to isolate the connector assembly for the aircraft's wiring harness from the battery power receptacle. In one embodiment the device comprises a cover, lock, and insulative material. The cover is locked onto the battery power receptacle. The insulative material provides electrical isolation between the locking device and the battery power receptacle. In a second embodiment the device is locked onto the connector assembly.

BRIEF DESCRIPTION OF THE DRAWING

Other objects, features and advantages of the invention will be apparent from the following detailed description and accompanying drawing, wherein.

DETAILED DESCRIPTION

In most aircraft today, at the point where the aircraft's electrical system is connected to the battery, a quick connect-disconnect system is utilized. So much of one such system is illustrated in the accompanying drawing figures as is necessary for an understanding of the present invention, and involves the mating of a connector assembly to a battery power receptacle. An example of same may be found in U.S. Pat. No. 5,427,541.

Figure 1A:
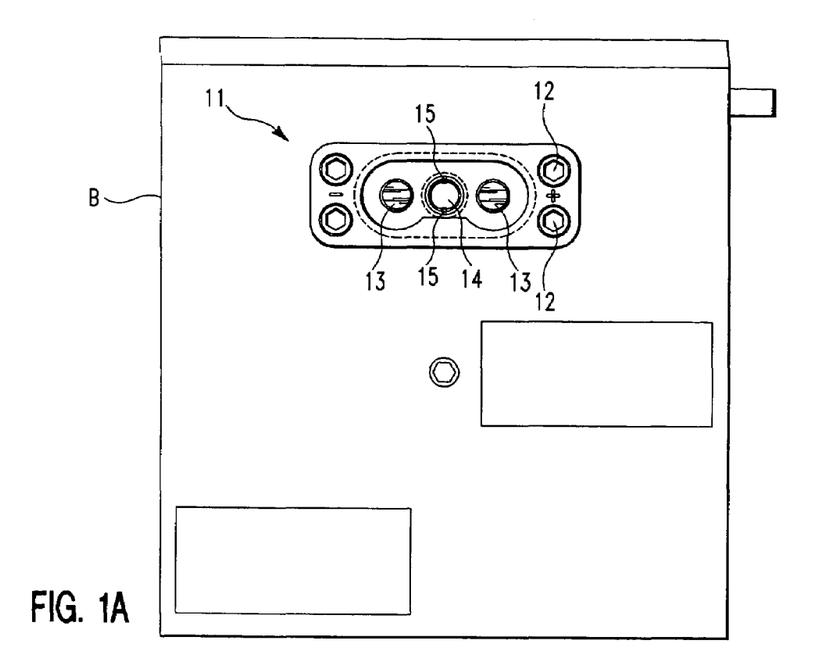
FIG. 1A is a side elevation of an aircraft battery showing its battery power receptacle mounted in the upper part of a side wall of the battery.

Referring to FIG. 1A of the drawing, a battery power receptacle is generally designated by the numeral 11 and is designed for mounting, usually at the top center on the sidewall of a battery B, by means of screws 12 passed through mounting holes and includes conductor pins which are connected to a respective one of the terminals of the battery B.

The battery power receptacle, with which the present invention is utilized conforms with Mil. Spec. MS 3509.

Figure 1B:
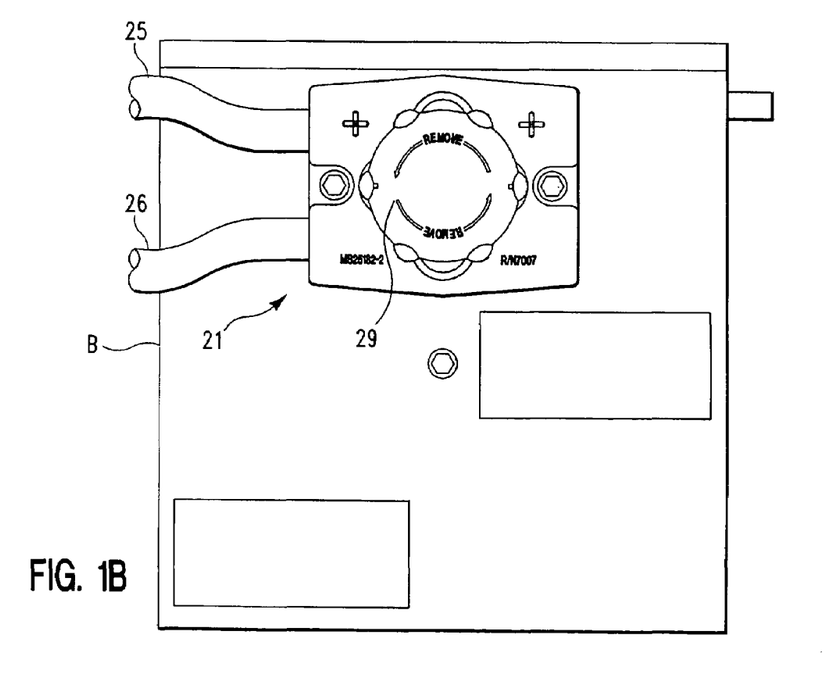
FIG. 1B is a side elevation view of the aircraft battery with a connector assembly of the aircraft electrical system in place.
Figures 3A, 3B:
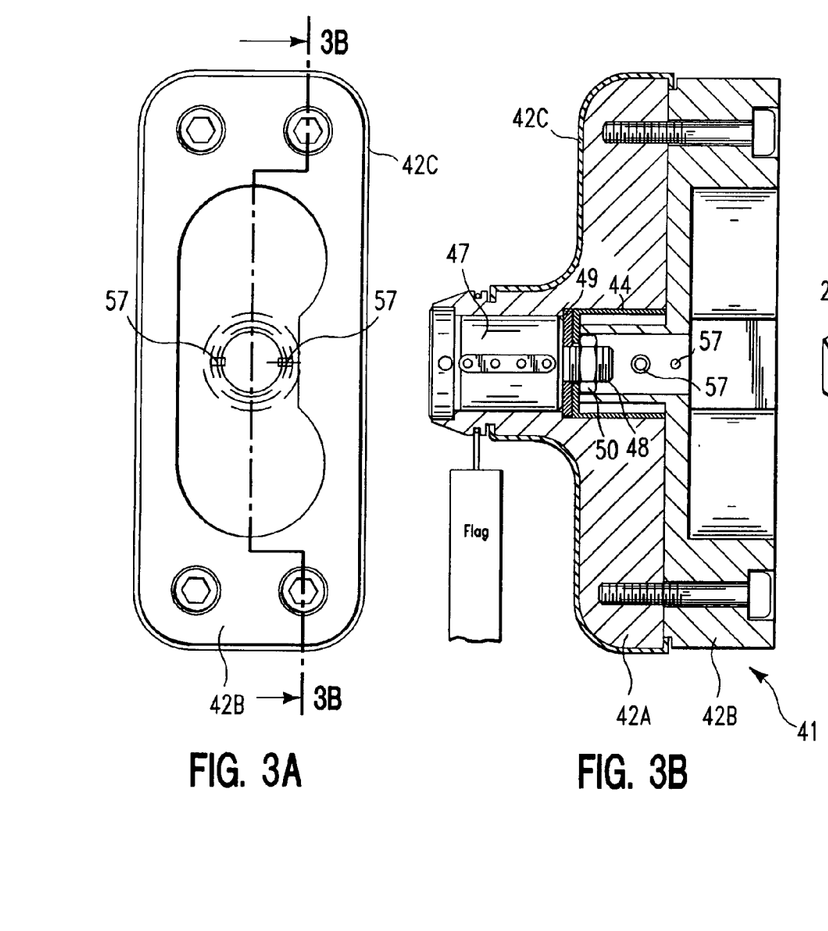
FIG. 3A is a top view of a battery lockout device for the connector assembly.
FIG. 3B is a cross sectional view of the device of FIG. 3A, taken along the lines 3B—3B in FIG. 3A.
Figure 3C:
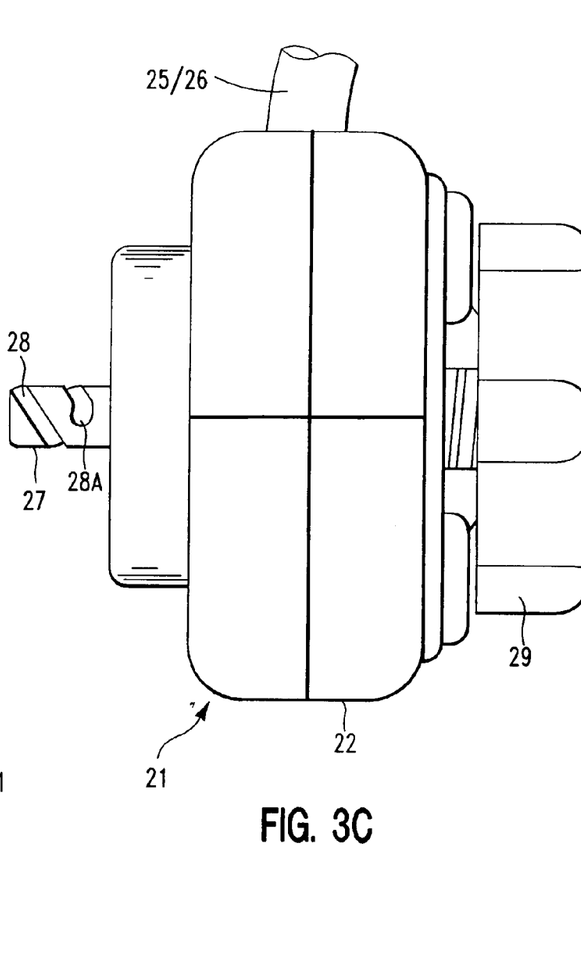
FIG. 3C is a side view of a connector assembly.

As shown in FIGS. 1B and 3C, a connector assembly designated generally by reference numeral 21 is constructed for mating with the receptacle 11.

The connector assembly 21 includes a two piece insulative housing 22. The housing 22 has a mating projection (not shown) adapted for insertion into a complementary recess (not shown) of the receptacle 11. Conductive socket members (not shown) are mounted within the housing 22 for mating with the conductive pins. The conductive socket members are mounted to respective base members (not shown), each having a terminal assembly that is fed from the aircraft's wiring harness 25,26.

A shaft 27 of the connector assembly 21 is adapted for insertion into a cavity 14 in the receptacle 11. The shaft 27 is formed with diametrically opposed helical grooves 28 with terminating detents 28A, which grooves mate with diametrically opposed plug retaining pins 15 in the receptacle cavity 14. The connector assembly with which the present invention is utilized conforms with either Mil. Spec. MS 25182 or MS 3349.

When the connector assembly shaft 27 is inserted into the receptacle cavity 14 and turned in a first direction by a knob 29 affixed to the shaft on the opposite side of the housing 22, the projection is drawn into the recess. When the shaft is turned in the opposite direction, the projection is withdrawn from the recess. This arrangement of shaft 27, cavity 14, socket members and conductive pins provides a quick connect-disconnect feature at the point where the battery receptacle 11 is electrically connected to the connector assembly 21.

When an aircraft is in use, the battery receptacle 11 and connector assembly 21 are, of course, coupled together in electrical continuity. But shortly after the aircraft is parked and no longer in use, the connector assembly 21 is disconnected from the battery receptacle 11 so that the aircraft electrical system does not drain the battery and the crew does not come back to a dead battery.

With the connector assembly 21 merely disconnected from the battery receptacle 11, there is no deterrent to reconnecting the connector assembly 21 to the battery receptacle 11, allowing for unauthorized use of the aircraft.

In accordance with the teachings of the present invention, a locking device that includes an electrically isolating member is locked onto either the battery receptacle or the connector assembly, thereby preventing reconnection of the connector assembly 21 and battery receptacle 11 by an unauthorized person and preventing unauthorized use and theft of the aircraft.

Figure 2A:
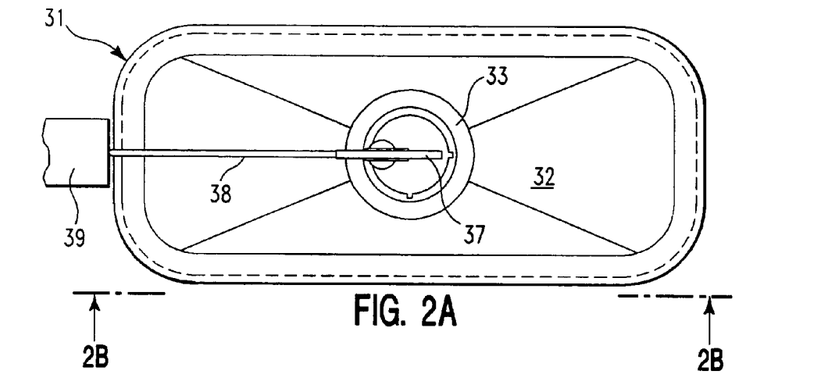
FIG. 2A is a top view of an aircraft battery lockout device of the present invention for use on the battery power receptacle shown in FIG. 1A.
Figure 2B:
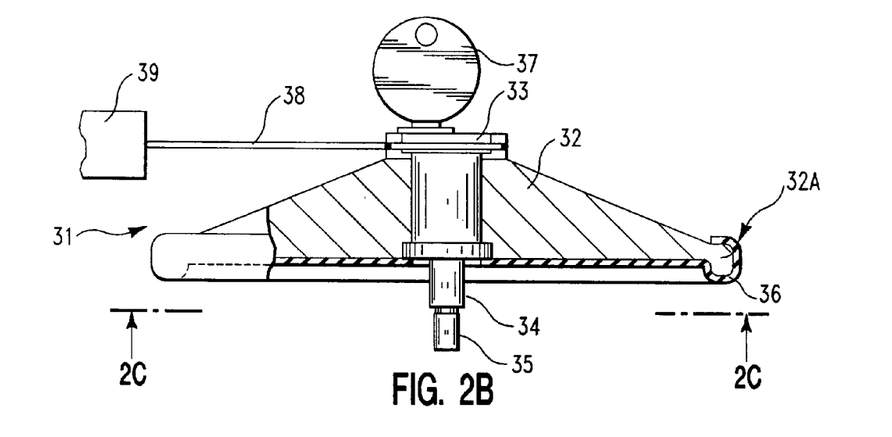
FIG. 2B is a side view, partially cut away, of the device of FIG. 2A.
Figure 2C:
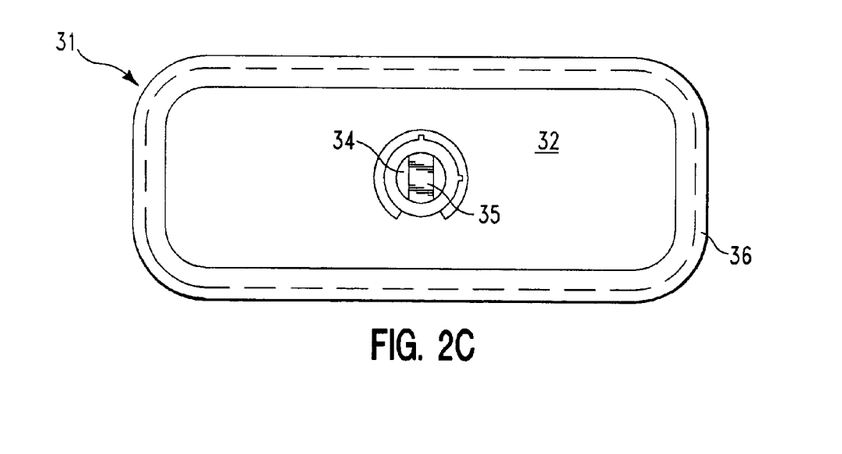
FIG. 2C is a bottom view of the device of FIG. 2A.

In accordance with a first embodiment of the invention and as shown in FIGS. 2A–2C, a locking device 31 comprises a rectangular, somewhat pyramid-shaped cover 32, a rotational key lock 33 mounted within the cover 32, a shaft 34 with rotary cam 35 extending from the rotating element of the lock 33 and an insulating member 36.

The shape of cover 32 diminishes the ability to tamper with device 31. The cover 32 is lipped at 32A for keying to the outside periphery of the receptacle 11, although the cover could also be keyed to an inner part of the receptacle 11. The device cover 32 is constructed of material more robust than the battery receptacle itself, for example hard anodized aluminum, so that someone trying to remove forcibly the device would destroy the battery receptacle and not be able to establish connection between the battery and the aircraft electrical system and thus not be able to operate the aircraft. The cover is of one-piece construction and forms the outer shell for the lock 33.

The insulating member 36, as of rubber, covers the bottom surface of the cover 32 for isolation and electrical insulation purposes. The member 36 stretches around the rounded off sidewalls and a portion of the upper surface of the cover 32.

With the connector assembly 21 disconnected from the battery receptacle 1, the device 31 is placed over the battery receptacle 11. The key shaft 34 extends into the receptacle cavity 14. A key 37 is turned and the receptacle cavity pins 15 mate with the key shaft cam 35, so that as the key 37 is turned, the device 31 is locked in place over the battery receptacle 11. The key 37 is removed and retained by the captain or some other authorized person for safekeeping until the next time the aircraft is to be used. With the device 31 locked in place to the battery receptacle 11, the battery B is no longer available to the aircraft electrical system.

The device 31 will work on any known aircraft, from a single engine prop plane to a jumbo jet. No modifications are required to the battery or aircraft, thus obviating the need for certification and compliance with Federal Aviation Requirements.

When in place, the device 31 is a viable aircraft theft deterrent. Besides preventing unauthorized use of an aircraft, it could be used to prevent inadvertent use of an unairworthy aircraft and inadvertent use of an unserviceable battery.

A non-conductive lanyard 38 may be used to tie a flag 39 to the device 31. The flag, typically, will contain the admonishment "Remove Before Flight".

When the device 31 is removed, it restores the aircraft to its original airworthy configuration.

Figure 4:
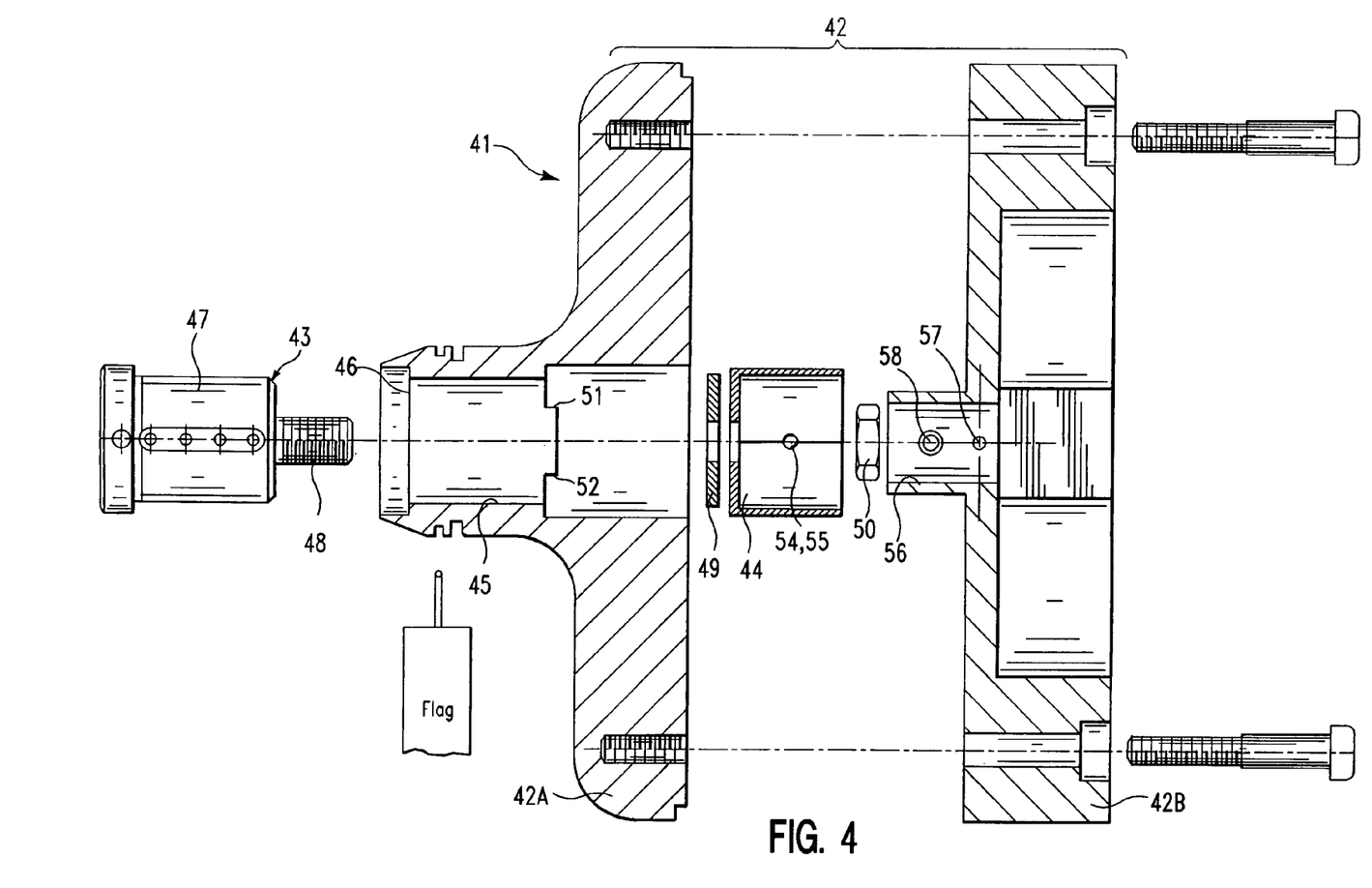
FIG. 4 is an exploded view of the battery lockout device shown in FIG. 3A.

In accordance with a second embodiment of the invention and as shown in FIGS. 3A, 3B and 4, the locking device 41 comprises a housing 42 of two pieces 42A (shown also in FIGS. 8A–8C) and 42B (shown also in FIGS. 7A–7C), a lock 43 and cup-shaped rotary cam 44.

Figure 8A:
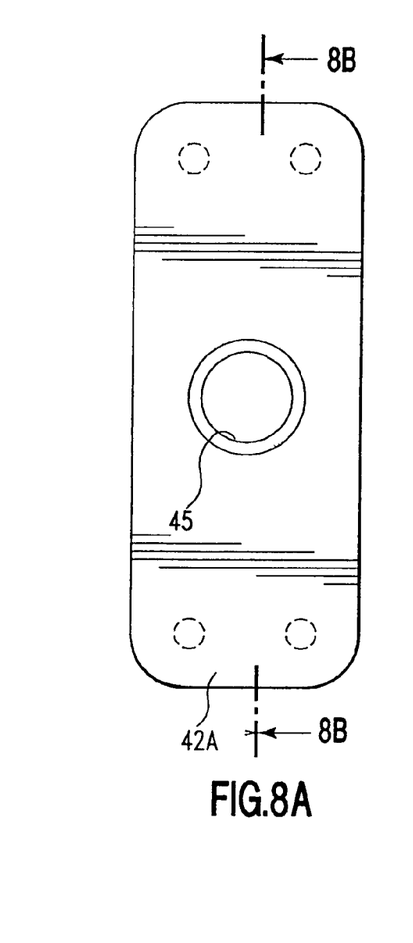
FIG. 8A is a top view of the upper housing piece shown in FIG. 4
Figure 8B:
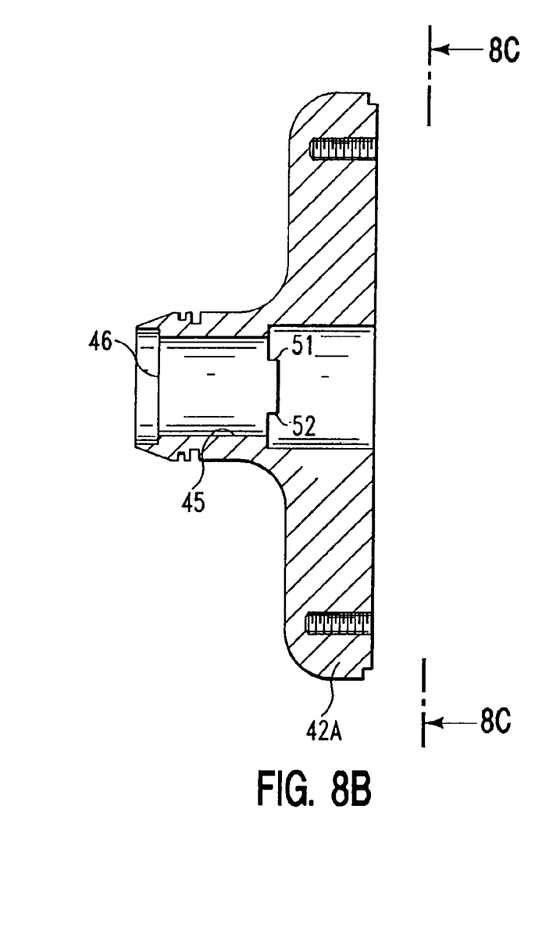
FIG. 8B is a cross sectional view of the upper housing piece shown in FIG. 4, taken along the lines 8B —8B in FIG. 8A; and, FIG. 8C is a bottom view of the upper housing piece shown in FIG. 4, taken from the lines 8C —8C in FIG. 8B.
Figure 8C:
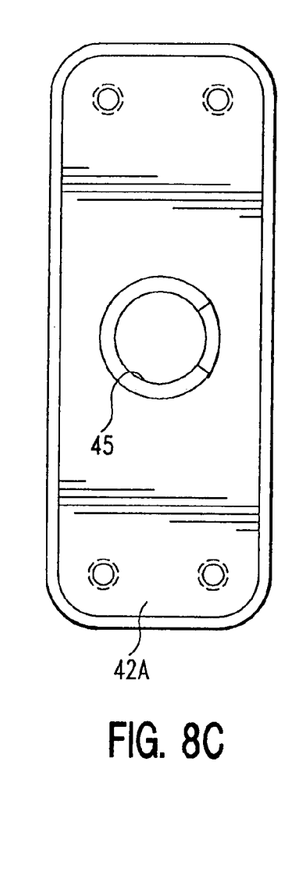

Upper housing piece 42A is provided with a bore 45 which forms the outer shell for the lock 43 and has a shoulder at 46 on which the lock 43 seats.

Figure 5A:
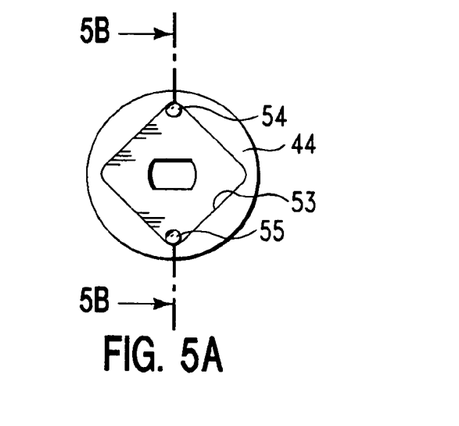
FIG. 5A is a front view of the cup-shaped cam shown in FIG. 4 when the locking device is in open position.
Figure 5B:
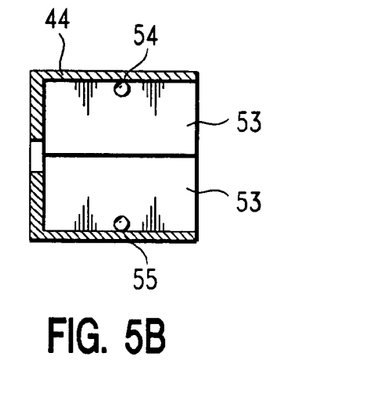
FIG. 5B is a cross sectional view of the cup-shaped cam shown in FIG. 4 when the locking device is in open position.
Figure 5C:
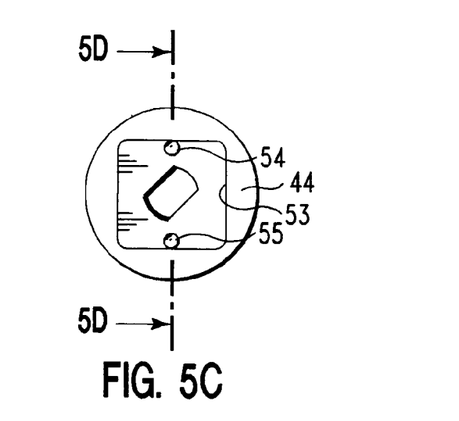
FIG. 5C is a front view of the cup-shaped cam shown in FIG. 4 when the locking device is in closed position.
Figure 5D:
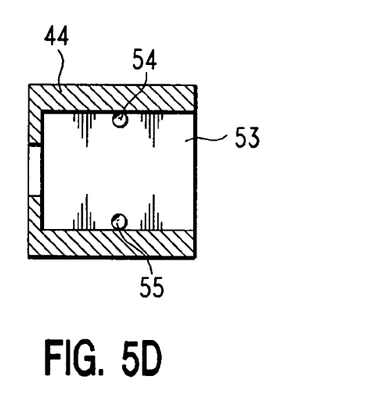
FIG. 5D is a cross sectional view of the cup-shaped cam shown in FIG. 4 when the locking device is in closed position.
Figure 6A:
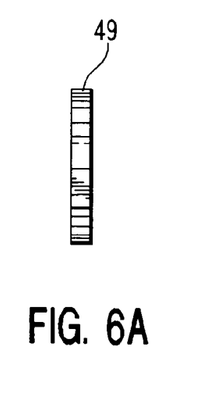
FIG. 6A is a left side view of the lock cam shown in FIG. 4.
Figure 6B:
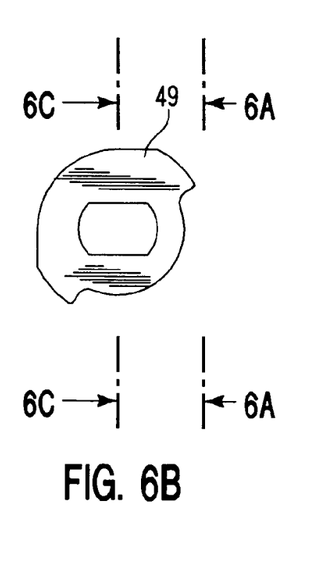
FIG. 6B is a front view of the lock cam shown in FIG. 4.
Figure 6C:
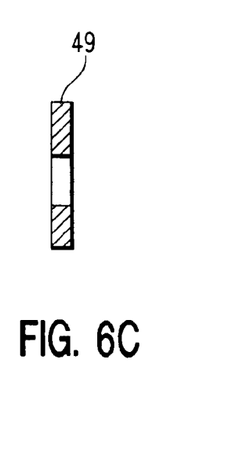
FIG. 6C is a right side view of the lock cam shown in FIG. 4.

Lock 43 includes lock plug 47 with threaded stud 48, key cam 49 (See also FIGS. 6A–6C) and securing nut 50. The cam 49 is able to rotate, when in position, until hitting stops 51,52, which stops together form or define ninety degrees of rotation for the lock 43. Cup-shaped rotary cam 44 has an opening 53 of square cross section and includes ball bearings 54,55 trapped in place but projecting partially out from its interior wall. In a first position, shown at FIGS. 5A and 5B, the ball bearings are free to move out. But upon ninety degrees rotation, and as shown in FIGS. 5C and 5D, the ball bearings 54,55 are forced inwardly.

Upper housing piece 42A is further provided with an electrically isolating rubber boot 42C. The boot 42C will provide electrical isolation for the connector assembly 21 and its locking device 41 from the battery power receptacle 11, as the device 41 and the receptacle 11 will be in fairly close proximity to each other, even in the disconnected mode.

Figure 7A:
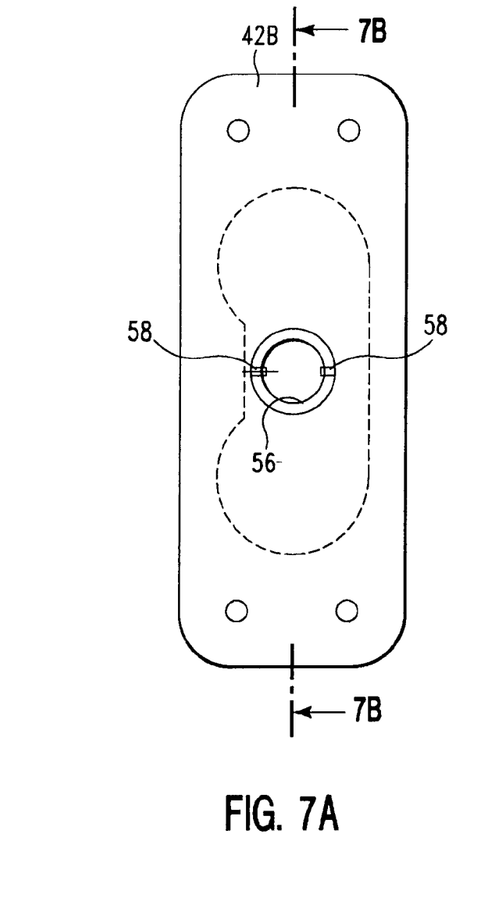
FIG. 7A is a top view of the lower housing piece shown in FIG. 4.
Figure 7B:
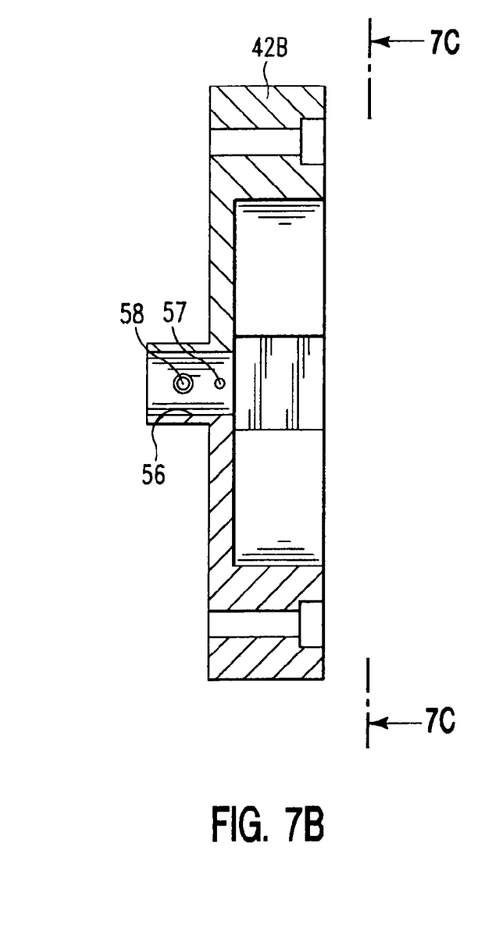
FIG. 7B is a cross sectional view of the lower housing piece shown in FIG. 4, taken along the lines 7B—7B in FIG. 7A
Figure 7C:
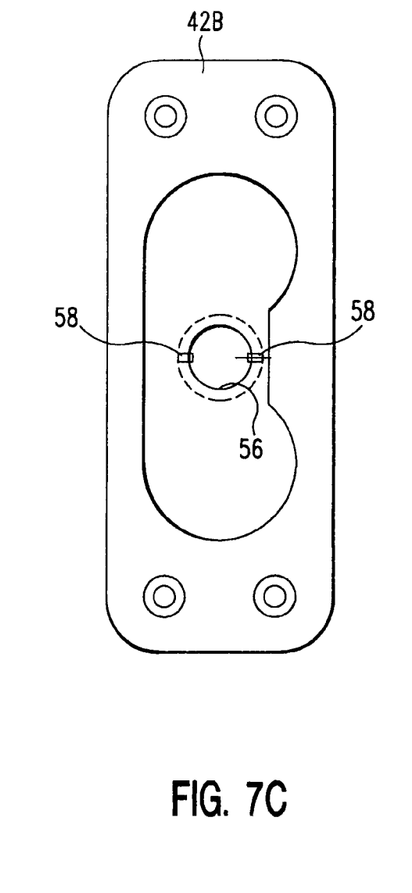
FIG. 7C is a bottom view of the lower housing piece shown in FIG. 4, taken from the lines 7C—7C in FIG. 7B.

Lower housing piece 42B includes a socket 56 having oppositely disposed, projecting pins 57 and oppositely disposed, tapered ball bearing nests 58.

As shown, the pieces 42A and 42B are screwed together to form the housing 42. Locking device 41 is used in the following manner. First the connector assembly 21 is disengaged from the battery power receptacle 11. Then the shaft 27 of the connector assembly 21 is inserted into the socket 56 and turned. The pins 57 engage the grooves 28 until stopped at the detents 28A. When at this position, the key of the lock 43 is now turned ninety degrees. The ball bearings 54,55 move from the free, unlocked position (FIGS. 5A and 5B) and are forced inwardly into the ball bearing nests 58 (FIGS. 5C and 5D). Projecting outwardly therefrom, the ball bearings 54,55 fall into the connector assembly grooves 28 and are aligned with the pins 57 in the detents 28A. The pins 57 and ball bearings 54,55 are a fixed distance apart and the device 41 is now locked onto the connector assembly 21. If one attempts any turning, pins 57 are trying to move laterally, while ball bearings 54,55 are trying to move diagonally. The conflicting action prevents turning. The key is removed until the next time when access to the connector assembly 21 is needed for operation of the aircraft.

It should be obvious that changes, additions and omissions may be made in the details and arrangement of parts without departing from the spirit and scope of the invention as hereinafter claimed.

What is claimed is:

1. For use with the connector assembly of an aircraft and for preventing re-connection of the connector assembly to the receptacle of an aircraft battery, the connector assembly including a housing, a rotatable shaft extending from the connector assembly housing, the shaft having diametrically opposed helical grooves with terminating detents,
   a locking device comprising:
   a locking device housing having
      an axial bore forming an outer shell and having
         rotational stops,
      an axial socket having
         projecting pins, and
         ball bearing nests;
   a lock received within the bore for rotation within the housing bore and secured to the housing having
      a key cam rotatable within the bore until hitting the stops; and,
   a cup-shaped rotary cam secured within the bore and having
      an interior wall, and
      ball bearings projecting from the interior wall,
whereby, upon placement and rotation of the connector assembly shaft within the socket, the axial socket projecting pins are engaged in the connector assembly grooves until stopped at the terminating detents, and upon further rotation of the lock, the rotary cam ball bearings are forced into the ball bearing nests and project into the connector assembly grooves to lock the locking device onto the connector assembly shaft.

2. The device of claim 1 wherein the locking device housing is provided with an electrically isolating upper piece.

3. The device of claim 1 wherein the locking device is provided with a lower piece including the socket with the projecting pins and the ball bearings.

4. For use with the connector assembly of an aircraft and for preventing re-connection of the connector assembly to the receptacle of an aircraft battery, the connector assembly including a housing, a rotatable shaft extending from the connector assembly housing, the shaft having diametrically opposed helical grooves with terminating detents,
   a locking device comprising:
   a locking device housing having
      an axial bore forming an outer shell and having
         a shoulder, and
         rotational stops,
      an axial socket having
         oppositely disposed, projecting pins, and
         tapered ball bearing nests;
   a lock received within the bore and resting on the shoulder, for rotation within the housing bore and having
      a lock plug with an axial threaded stud,
      a key cam rotatable within the bore until hitting the stops,
      a securing nut for securing the lock to the housing; and,
   a cup-shaped rotary cam secured about the stud and having
      an interior wall, and
      ball bearings projecting from the interior wall,
whereby, upon placement and rotation of the connector assembly shaft within the socket, the axial socket projecting pins are engaged in the connector assembly grooves until stopped at the terminating detents, and upon further rotation of the lock, the rotary cam ball bearings are forced into the ball bearing nests and project into the connector assembly grooves to lock the locking device onto the connector assembly shaft.

* * * * *